Aug. 4, 1942.   C. W. EVANS   2,292,110
BEEHIVE
Filed Oct. 19, 1940   2 Sheets-Sheet 2
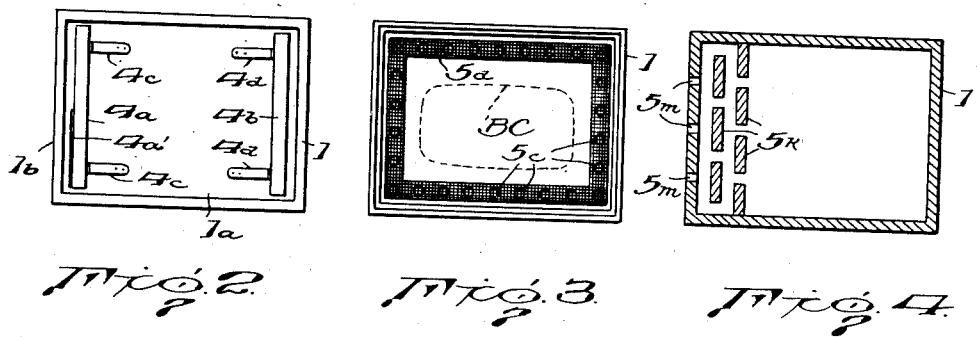
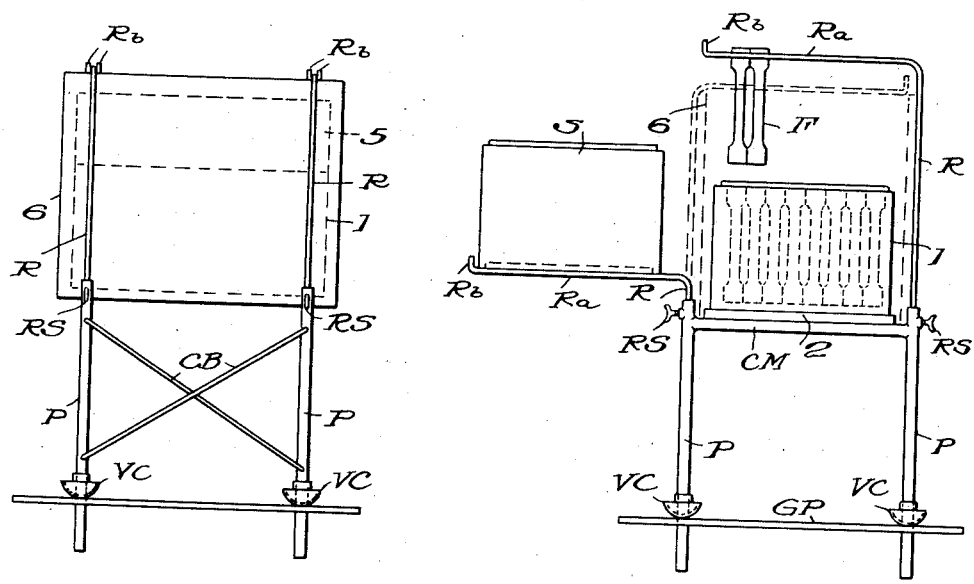
Inventor
Clarence W. Evans,
By Ralph B. Stewart
Attorney Patented Aug. 4, 1942

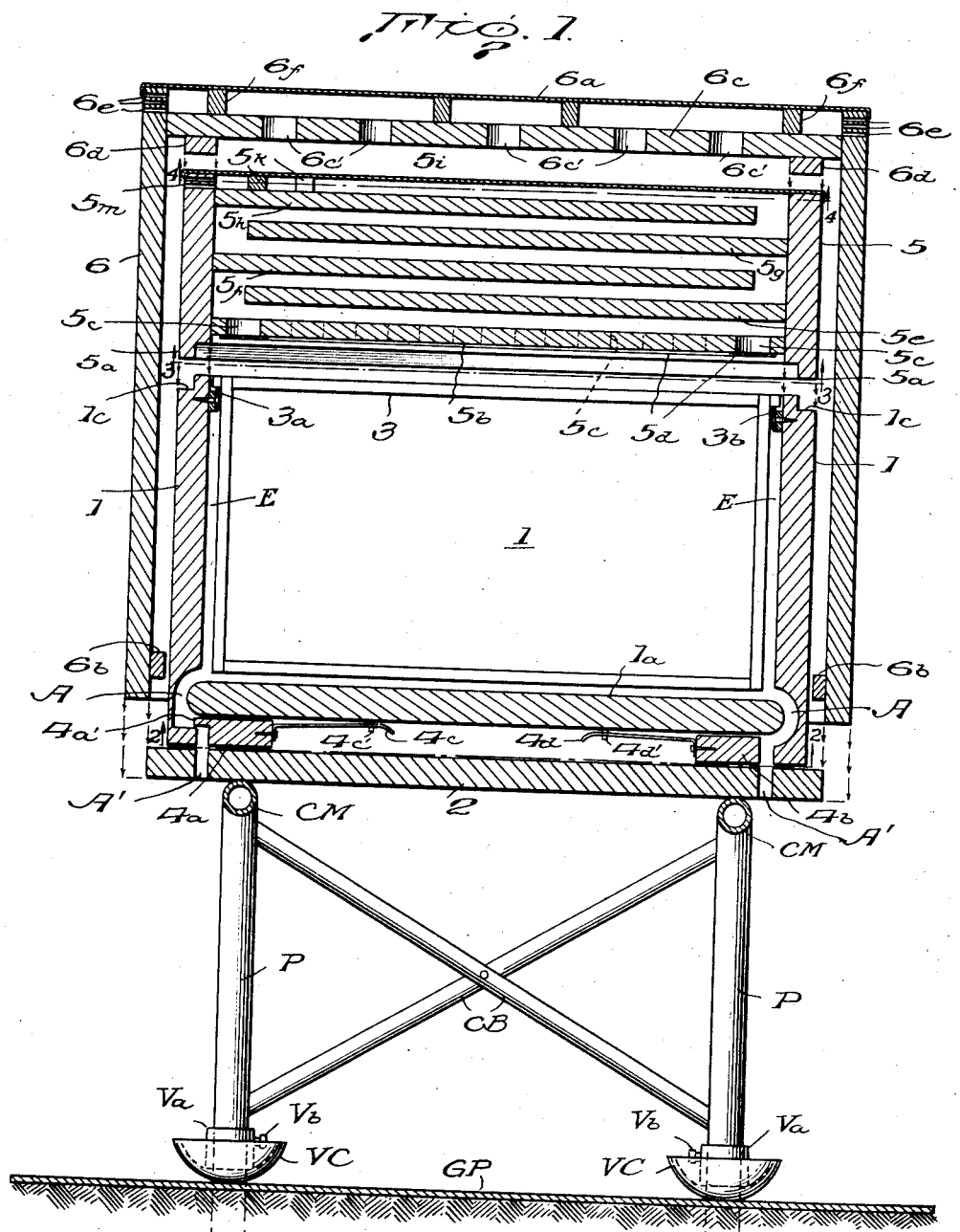

2,292,110

UNITED STATES PATENT OFFICE 2,292,110

BEEHIVE

Clarence W. Evans, Portville, N. Y.

Application October 19, 1940, Serial No. 361,966

19 Claims. (Cl. 6—1)

My invention relates to improvements in beehives.

Broadly, the objects of my invention are to provide an all-weather, all-season beehive which will provide more favorable working conditions for the bees during the summer, will simplify the wintering of the bees, and will facilitate the handling or manipulation of the component parts of the hive.

More specifically, the objects of my invention are:

To improve the healthfulness of the brood chamber by protection of the chamber against storms, extreme variations in temperature, entrance of damp air, by the proper elimination of foul air, and by providing a proper supply of dry, fresh air to the chamber; to avoid suffocation of the bees due to possible obstruction of the entrance; to reduce the tendency of the bees to swarm or cluster on the exterior of the hive during warm weather by the provision of proper insulation of the brood chamber against high temperatures; to quicken the evaporation of the nectar by providing proper ventilation of the hive; to reduce the amount of propolis deposited by the bees by guarding against entry of light to the beehive; and to provide devices for facilitating the handling or manipulation of the component parts of the hive during inspection thereof.

The objects of my invention are attained through the use of several novel features of construction as follows:

1. An improved bee entrance or passageway formed in the bottom wall of the hive and comprising a tortuous passage so arranged as to be absolutely dry at all times and to exclude wind, vermin and light from the hive.

2. An improved roof or cover construction for the brood chamber providing an air-circulating system for permitting a constant and slow infiltration of fresh air to the brood chamber and venting off the foul air while preventing back drafts and entrance of light into the brood chamber.

3. An outer jacket or cover for the hive to provide for proper ventilation of the hive and, at the same time, provide insulation against extreme changes in temperature.

4. An improved support for the beehive for maintaining the hive off the ground, preventing dampness from entering the hive through the bottom thereof, and also involving suitable means for preventing ants and other vermin from entering the hive. The improved support includes novel constructions which are useful for supporting the various parts of the hive and the honey frames at times when the hives are to be inspected.

My improved beehive results in improved health of the bees, both young and old, and especially improved health of the queen, and there is a reduced tendency of the bees to swarm, with a consequent increase in the production and improvement in the quality of the honey.

A preferred embodiment of my improved beehive is illustrated in the accompanying drawings in which:

Figure 1 is a transverse vertical sectional view showing the details of construction of the hive, the vertically-separable parts being shown in vertically-spaced relation for the sake of clearness of illustration;

Figure 2 is a bottom view, on a smaller scale, taken along the line 2—2 of Figure 1;

Figure 3 is a bottom view on a reduced scale of the top for the brood chamber taken along the line 3—3 of Figure 1;

Figure 4 is a sectional view of Figure 1 taken along the line 4—4 on a reduced scale;

Figure 5 is a side elevational view illustrating the improved support for the beehive; and Figure 6 is an end elevational view illustrating the manner in which the improved support is employed to facilitate inspection of the hive.

Referring to the drawings, especially to Figure 1, the brood chamber of the hive comprises a rectangular box-like structure 1 having two side walls, two end walls, and a bottom board 1a positioned somewhat above the bottom edge of the side and end walls of the chamber.

The brood chamber 1 rests upon a second bottom board 2 forming the bottom wall of an outer protecting jacket to be described later, and bottom board 2 is supported above the ground upon a suitable stand or rack to be described hereinafter.

Within the brood chamber 1 a number of brood frames 3 are supported transversely of the chamber upon rails 3a and 3b mounted on opposing faces of the end walls of the brood chamber by suitable screws and maintained in spaced relation to the side walls by suitable spacing elements arranged under the rails. The end walls and the bottom wall of the brood frames 3 are spaced from the side walls and bottom wall of the brood chamber 1 to provide bee passages indicated at E, E, E. The bee entrances to the brood chamber 1 are arranged in the bottom wall construction and are preferably made in the form of slot-like entrances formed on opposite sides or ends, as desired, of the bottom board 1a and follow a tortuous path so as to exclude direct light rays, storms and drafts from the brood chamber. As shown in Figure 1, the entrance passages A—A are formed at the bottom of the brood chamber preferably by rounding or shaping the opposite end edges of the bottom board 1a into substantially half-round form as shown, and each of the rounded edges extends into a substantially half-round horizontal groove formed or cut in the face of the adjacent end wall of the brood chamber 1. This arrangement provides a curved or tortuous path for the bee entrances and prevents direct light rays, rain, snow and air drafts from entering the brood chamber.

A pair of adjustable closure strips 4a and 4b are arranged between the bottom board 1a and the lower bottom board 2, and the intervening space between the end walls of brood chamber 1 and the strips 4a and 4b comprises a vertical extension of the bee entrances A—A. Longitudinal slots A', A' are cut in the lower bottom board 2 to register with the bee entrances A—A controlled by the adjustable closure strips 4a and 4b. It will be understood that the bees enter the slots A', A' formed in the lower bottom board 2, and since these slots are located underneath the beehive, they are protected from storms, wind, vermin and the like, and are not likely to be obstructed. Adjustable strips 4a and 4b are maintained in adjusted position by latch elements 4c and 4d comprising strips of spring metal having holes formed therein for engagement with pins 4c' and 4d' secured in the bottom board 1a. Any other form of suitable adjustable latch or holding device may be used. By adjusting the positions of the strips 4a and 4b, the bee entrance may be entirely closed, or opened to any desired extent. In the case of cold weather, it is desirable to entirely close one of the bee entrances to allow only part of the other bee entrance to remain open, and for this purpose, one of the adjustable strips, for example strip 4a, is provided with a tongue extension 4a' along a part of its length which extends over a shoulder formed on the inner face of the adjacent side wall of the brood chamber. Thus, when the strip 4a occupies the position shown in Figure 1, that portion of the bee entrance which is co-extensive with the tongue 4a' is closed while the remaining part of the entrance slot remains open. By shifting the strip 4a further to the right, the entire entrance slot may be opened. The arrangement of the tongue 4a' on a part only of the strip 4a is clearly shown in Figure 2.

By arranging the bee entrances underneath the hive, there is no "front" or "back" to the hive and the hive may be arranged in any position regardless of the sun or prevailing winds. While I have shown only two bee entrances arranged along opposite end edges of the bottom board, additional bee entrances may be provided along the side edges of the bottom board, if desired. It will be understood, however, that only one bee entrance slot may be provided if desired, and this slot might be arranged along any edge of the bottom board or formed in the board at a position away from the edges. Since the entrances exclude direct light rays from the brood chamber, the bees will have a sense of complete isolation and security, and there will be less propolis used by the bees in the hive, since the entrance of light into the brood chamber tends to increase the amount of propolis deposit. Since the bee entrance according to my invention enters the brood chamber level with the chamber floor, it is a very simple matter for the bees to dispose of waste matter by simply pushing it into the entrance passage where it falls to the ground outside. By the arrangement of the bee entrances underneath the hive, the bees are more active, since they are never restrained from leaving the hive by being compelled to travel over a wet, disagreeable landing board in front of the hive as in constructions in common use.

The brood chamber 1 is provided with a ventilating and insulating cover construction 5 formed as a rectangular box-like structure having side and end walls of the same horizontal dimensions as the side and end walls of the brood chamber. For the purpose of securely positioning the cover 5 on the brood chamber 1 and providing a storm and light-proof joint between these two sections of the hive, the upper edges of the walls of the brood chamber are grooved at 1c for receiving a tongue 5a formed on the lower edges of the vertical walls of the brood chamber cover 5. As shown in Figure 1, the cover 5 is spaced from the brood chamber 1 for the purpose of more clearly illustrating the construction, but is in vertical alignment with the brood chamber. The cover 5 is provided with a bottom wall 5b arranged to be spaced somewhat above the brood frames 3 when the cover 5 is in its normal position resting on the brood chamber. A series of ventilating openings 5c are formed in the bottom board 5b around the outer edge of the board as clearly shown in Figure 3. It is understood there are other forms of vent openings suitable to provide ventilation which would not require covering with screen or netting, such as a series of short, narrow slots, parallel with each other, located the same as the screened openings. Suitable screen or netting material 5d is arranged over these ventilating openings to prevent bees from passing from the brood chamber into the cover 5. Above the bottom 5b are arranged a series of vertically spaced, horizontal boards or baffles 5e, 5f, 5g, and 5h, alternating boards extending outwardly from opposite side walls of the cover 5, whereby a tortuous or zig-zag passage for the foul air from the brood chamber 1 is provided as shown in Figure 1. A metal cover plate 5i, with a depending flange around its edges, is provided on the top of the brood cover 5, and a series of spaced baffles 5k are arranged in the space between the baffle board 5h and the top plate 5i and form, from either direction, draft retarding openings arranged in front of exit openings 5m formed in one of the side walls of the cover 5. The openings 5m are storm-proof openings consisting of a plurality of small round openings, extending through one or more outer wall or walls of the roof, preventing a driving rain from entering due to the length of the small openings and to the slight but sufficient air resistance from within, which provide for the proper ventilation of the brood chamber, but prevent disturbance of the bees by storm and other disturbances entering these openings.

The cover 5 provides a ventilating, heat and cold insulating, and damp absorbing cover for the brood chamber whereby a natural system of air-conditioning constantly permits a very slow and gentle infiltration of fresh air to enter as desired at one or more of the bottom entrances and rise along the outer wall or walls, thus causing the damp, fouled air to pass upward through screened openings 5c in the bottom board 5b of the cover. These openings are arranged only along the outer edges near the walls of the cover, thus renewing the air only at the outer edges of the bee cluster, which is indicated in dotted lines at BC in Figure 3. The fouled air then enters a series of indirect air passages formed by baffle boards 5e, 5f, 5g, and 5h arranged one above the other, and finally passes through a draft-baffled passage above 5h to storm-proof apertures 5m in the outer walls of the cover to the air space between hive and body and outer walls of the insulating jacket, or to the outside air in case the outside jacket is not in place. This improved cover is absolutely light-proof and prevents all accumulation of dampness or moisture (caused by condensation or otherwise) within the brood chamber. The moisture thrown off by evaporation of the nectar in the honey supers passes off more rapidly, thereby increasing the production of honey and with the removal of strong foul odors, the quality of the honey is greatly improved and a whiter capping will result.

It will be seen that the construction described up to this point comprises a complete storm-proof and light-proof beehive which may be used with the advantages already stated and without the outer jacket mentioned previously, especially at times when the weather or climate is moderate.

Where there are extreme variations in temperature, I provide an outer ventilating and insulating cover or jacket for the hive to completely surround the brood chamber and its cover. This jacket consists of a box-like arrangement 6 open at the bottom and provided with a top plate 6a, preferably formed of a metallic plate having a depending flange around its edges and embracing the walls of the jacket 6. The jacket 6 is made slightly larger than the brood chamber 1 and the open end of the jacket 6 fits over the outer edges of the bottom board 2 as indicated in dotted lines in Figure 1. Suitable spacing cleats or battens 6b are provided on the inner faces of the walls near the open end of the jacket for guiding the jacket over the brood chamber in proper relation to the bottom board 2. Also, near the top of the jacket 6 is arranged a horizontal partition 6c spaced from the cover 6a, and suitable battens 6d are provided on the lower face of the partition 6c to maintain this partition in spaced relation to the cover plate 5i of the brood cover 5. The battens 6d arranged immediately above the exit openings 5m formed in the cover 5 are interrupted at spaced intervals, or provided with horizontal apertures, to permit the foul air leaving the openings 5m to pass into the space between partition 6c and the cover plate 5i. From this space, the foul air passes through suitable openings 6c' formed in the partition 6c and enters the space between the partition 6c and the jacket cover 6a. From this space, the foul air passes out through storm-proof apertures 6e formed in the vertical outer walls of jacket 6. The same arrangement as used in hive roof 5 could be used for this insulating jacket roof. Suitable draft-retarding baffles 6f are provided in the space between the partition 6c and the jacket cover 6a to prevent back drafts through the exit openings 6e. These baffles are arranged in staggered relation in the same way as the baffles 5k as shown in Figure 4. This type of insulating jacket permits of quick inspection of the brood hive at any time and no further winter packing or care is necessary, except to make sure there is plenty of honey and that the air inlets are properly closed. There will be no sudden changes in temperature which are very injurious to the bees during the winter months. Bees will start rearing broods earlier in the spring and will brood later in the fall, thus entering winter with large, strong colonies. In extremely warm weather, the hive will be cooler and the bees more active. There will be no idle clustering on exterior of hive, and there will be less incentive to swarm.

During the honey season, it will be understood that additional honey supers will be placed on the top of the brood chamber 1 between this chamber and the cover 5, the supers being formed with interlocking joints similar to the joints 1c—5a between the brood chamber 1 and the cover 5. Where the additional honey supers are inserted in this manner, additional sections for the outer jacket 6 will be inserted beneath the jacket 6, and these sections will correspond in height to the height of the added honey supers.

Another novel feature in my invention is an improved supporting frame or rack for the beehive to maintain the hive above the ground. This support is an open framework of rectangular construction and includes four vertical corner posts P, P, P, P preferably formed of iron pipe, and these posts are of sufficient length to support the hive a distance above the ground of the order of sixteen inches and they also extend into the ground a distance to securely hold the frame in position. The base board 2 of the hive rests upon a pair of parallel cross members CM joining the corner posts on opposite sides of the frame near the top thereof, as shown in the drawings. These cross members may be secured to the posts P in any desired manner as by welding. It is important that the interior of the post P be allowed to remain unobstructed. The corner posts P may also be braced laterally by cross-bracing members CB as shown in Figure 5, and these bracing members may be placed on all four sides of the frame if desired. Immediately below the hive, a thin plate of metal or other suitable material GP is placed upon the ground and this plate includes four holes or apertures through which the corner posts P of the supporting frame pass into the ground. The purpose of ground plate GP is to prevent the growth of vegetation beneath the hive and in the immediate vicinity. Each corner post is provided with an anti-vermin cup VC containing a liquid to prevent insects and other vermin from entering the hive by way of the post. Each cup has a sleeve Va extending upwardly from the bottom of the cup for adjustably mounting this cup upon the post P, and in mounting the cup in position, it is forced down against the ground plate GP and then clamped to the post by a set-screw Vb so that the cup bears against the plate and prevents the post from sinking further into the ground as the load or weight of the hive increases.

A metal rod R is slidably mounted in each corner post P and these rods may be adjusted vertically and clamped in any desired position by suitable set screws Rs. Each rod is provided with a horizontal portion Ra and the outer end of each rod is bent or formed into a short vertical portion Rb.

Normally, the rods R are positioned so that the horizontal sections Ra of the rods extend across and are in contact with the top of the hive jacket 6. When the rods are clamped in this position, they serve to securely hold the hive upon the supporting stand or frame. When it is desired to inspect the hive, one set or pair of rods at one side of the hive is positioned as shown at the left end of the hive in Figure 6 so that they will form a worktable for supporting parts of the hive, such as an extra honey super S shown in the drawings. The other pair of rods are positioned so that the horizontal sections Ra extend over the brood chamber and are elevated above the chamber a sufficient distance so that after the brood frames F are inspected, they may be suspended from the two parallel horizontal portions Ra of the rods. Two brood frames F are shown supported from the rods in Figure 6. This arrangement greatly facilitates inspection of the brood frames and greatly lessens the possibility of losing the queen bee, since she would drop into the brood chamber if she should leave the brood frame.

It will be seen that I have provided a strong, convenient, rot and damp-proof support for the beehive, solid enough to fully support the beehive and its component parts when completely filled with brood and honey, maintaining the hive up off the ground and being so shaped as to prevent the accumulation of water and snow underneath the hive, thus preventing dampness entering through the bottom of the hive, preventing the entrance of ants and other vermin, preventing the growth of all vegetation beneath the hive and immediate vicinity, and retarding the accumulation of dampness below the hive.

What I claim is:

1. In a beehive, a brood chamber comprising a box-like structure having side and end walls and a bottom board, and including at least one bee entrance for said brood chamber comprising a slot-like passage formed between one of said walls and the adjacent edge of said bottom board, said passage being tortuous to exclude light from said brood chamber.

2. In a beehive, a brood chamber comprising a box-like structure having side and end walls and a bottom board, at least two of said walls being provided with horizontal grooves formed in opposing faces thereof for receiving adjacent edges of said bottom board, said adjacent edges of said bottom board being arranged to extend into said grooves, but being spaced from the walls of said grooves to provide tortuous bee entrances to said brood chamber at opposite edges of said bottom board.

3. In a beehive, a brood chamber comprising a box-like structure having side and end walls and a bottom board, said end walls being provided with horizontal grooves of substantially semi-circular section for receiving the adjacent edges of said bottom board, and the adjacent edges of said bottom board being rounded to substantially semi-circular form and being spaced from the adjacent walls of said semi-circular groove to provide substantially semi-annular bee entrances on the opposite ends of said brood chamber.

4. In a beehive, the combination of a brood chamber comprising a box-like structure having side and end walls and a bottom board, a pair of horizontal rails supported on the opposing faces of said end walls near the top thereof, a plurality of brood frames supported transversely of said brood chamber upon said rails, said brood frames being spaced from the end walls and bottom board of said brood chamber to provide for bee passages at the ends and bottom sides of said frames, and slot-like bee entrances for said brood chamber formed between the end walls thereof and the bottom board, said bee entrances having entrance openings on the underside of said brood chamber.

5. In a beehive, the combination of a brood chamber, comprising a box-like structure open at the top and including means for supporting a plurality of brood frames therein, a cover for said brood chamber supported thereon and embodying a separable storm-proof joint connection between said brood chamber and said cover, said cover comprising a box-like structure having a bottom wall spaced above said brood frames and having a plurality of ventilating openings formed around the outer edge thereof, a plurality of vertically spaced horizontal baffle boards arranged within said cover to provide a tortuous path for foul air rising from said brood chamber through said ventilating openings, and storm-proof exit apertures formed in one of the vertical walls of said cover near the top thereof for venting the foul air from said tortuous path to the outside of said cover.

6. A beehive construction according to claim 5 wherein said ventilating openings on the bottom board of said cover surround the space for the bee cluster, and screening means is provided over said openings to prevent the bees from entering said cover.

7. In a beehive, the combination of a brood chamber comprising a box-like structure having an open top, a box-like cover for said brood chamber detachably mounted upon said chamber by a storm-proof joint, a plurality of ventilating openings formed in the bottom wall of said cover for venting foul air from said brood chamber into said cover, and means arranged within said box-like cover for providing a tortuous path for the flow of said foul air upwardly within said cover to the top portion thereof, storm-proof apertures formed in at least one vertical wall of said cover near the top thereof, and draft-retarding baffles arranged within said cover opposite said apertures.

8. In a beehive, the combination of a base board, a brood chamber supported upon said base board and including a bottom board spaced above said base board to provide a closed space between said base board and said bottom board, a bee passage connecting said closed space with the interior of said brood chamber, a bee passage extending from said closed space through said base board to the outside of said hive and adjustable closure means arranged within said closed space for adjustably closing one of said passages.

9. In a beehive, the combination of a base board, a box-like brood chamber supported upon said base board and including side and end walls resting on said base board and a bottom board spaced above said base board to provide a closed space between said base board and said bottom board, said brood chamber including a pair of slot-like bee passages connecting said closed space with the interior of said brood chamber and being formed between the end edges of said bottom board and the adjacent end walls thereof, a pair of slot-like bee passages extending from said closed space through said base board to the outside of said hive and arranged substantially below and parallel with the pair of bee passages formed at opposite edges of said bottom board, and a pair of adjustable closure strips arranged within said closed space and being adjustably spaced with respect to the side walls of said brood chamber to form adjustable bee passage sections connecting the passages in said bottom board with the passages in said base board.

10. In a beehive, a brood chamber having a bee entrance comprising a slot-like opening in said chamber, and a closure strip for said bee entrance arranged parallel with said slot and being movable transversely thereof, said closure strip having a tongue extension along a part of the length thereof whereby a portion of said slot may be closed while the remaining part of the slot remains open.

11. A beehive according to claim 8 wherein said base board extends laterally beyond said brood chamber on all sides, and an insulating jacket for said brood chamber comprising a box-like casing having an open bottom embracing the edges of said base board.

12. In a beehive, the combination of a base board, a brood chamber supported upon said base board with said base board extending laterally beyond said brood chamber on all sides thereof, a removable insulating cover for said brood chamber, said insulating cover including a tortuous ventilating passage for venting foul air from said brood chamber, and an insulating jacket for said brood chamber comprising a box-like casing having an open bottom embracing the edges of said base board, said jacket having a horizontal partition spaced from the insulating cover of said brood chamber and spaced below the top wall of said jacket, said horizontal partition being provided with venting apertures to allow the passage of foul air from the lower portion of said jacket into the said space between said partition and the cover of said jacket, and storm-proof apertures formed in at least one wall of said jacket for venting the foul air from said space, and draft-retarding baffles arranged in said space adjacent said storm-proof apertures.

13. In combination, a beehive formed of separable parts, a support for said hive comprising a frame having four vertical hollow corner posts, a pair of horizontal cross members arranged between pairs of said corner posts near the top thereof and carrying said hive, four rods slidably mounted within said hollow corner posts, each of said rods having a vertical portion extending upwardly to the top of said hive and a horizontal portion extending over and in contact with the top of said hive, and means provided on each post for clamping said rods in position with the horizontal portion thereof in firm contact with the top of said hive whereby said rods serve as clamps to hold said separable parts together and to maintain said hive on said support.

14. A beehive and support therefor according to claim 13 wherein the horizontal portions of two of said rods extending over said hive are spaced apart a distance suitable for suspending brood frames between said horizontal portions when said frames are being inspected, and the other pair of rods are freely rotatable to a position so the horizontal portion thereof extends away from said hive and may be utilized for supporting component parts of said hive during inspection thereof.

15. A beehive and support according to claim 13 and including a sheet metal plate arranged beneath said hive and extending laterally beyond said hive on all sides for preventing the growth of vegetation beneath said hive.

16. In combination, a beehive having a bee entrance on the underside thereof, an open frame work supporting said hive above the surface of the ground, and a sheet of weather-proof material arranged beneath said hive and extending laterally beyond said hive on all sides thereof for preventing the growth of vegetation beneath said hive.

17. A beehive support comprising an open frame work having four vertical corner posts, a ground plate of sheet metal having four apertures for receiving the lower ends of said corner posts, an anti-vermin cup mounted upon each corner post above said ground plate, each of said cups being mounted for adjustment on each supporting post and including means for clamping the cup in adjusted position.

18. A beehive having a horizontal bottom wall, and a slot-like bee passage having an entrance on the lower surface of said bottom wall and extending vertically upward, a portion of said passage being formed between a pair of spaced wall members, one of which has a rounded groove formed therein and the other has a rounded edge extending into said groove but in spaced relation thereto.

19. A beehive support and clamp comprising a frame having vertical tubular corner posts and horizontal braces between certain of said posts constituting a rest for a beehive, rods slidably mounted within said posts, each rod having a portion extending upwardly and a horizontal portion at the upper end thereof, means on each post for clamping the rod therein in any desired adjusted position, said rods being turnably mounted in said posts, said rods being so constructed and arranged that the free upper ends thereof may be positioned in clamping relation to a beehive on said support or some of the arms may be positioned to act as supports for individual frames of the beehive, and others of said rods may at the same time act as the support for a section of the beehive.

CLARENCE W. EVANS.